United States Patent
Takebe et al.

(10) Patent No.: US 11,312,825 B2
(45) Date of Patent: Apr. 26, 2022

(54) STRUCTURE

(71) Applicant: TORAY INDUSTRIES, INC., Tokyo (JP)

(72) Inventors: Yoshiki Takebe, Ehime (JP); Takashi Fujioka, Ehime (JP); Masato Honma, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 285 days.

(21) Appl. No.: 16/471,782

(22) PCT Filed: Dec. 20, 2017

(86) PCT No.: PCT/JP2017/045807
§ 371 (c)(1),
(2) Date: Jun. 20, 2019

(87) PCT Pub. No.: WO2018/117188
PCT Pub. Date: Jun. 28, 2018

(65) Prior Publication Data
US 2020/0087471 A1    Mar. 19, 2020

(30) Foreign Application Priority Data
Dec. 22, 2016 (JP) ............... JP2016-248750

(51) Int. Cl.
*C08J 5/00* (2006.01)
*C08J 5/04* (2006.01)

(52) U.S. Cl.
CPC ............ *C08J 5/043* (2013.01); *C08J 5/042* (2013.01); *C08J 5/046* (2013.01); *C08J 2311/02* (2013.01); *C08J 2323/16* (2013.01); *C08J 2323/22* (2013.01); *C08J 2367/00* (2013.01); *C08J 2375/04* (2013.01); *C08J 2377/00* (2013.01)

(58) Field of Classification Search
CPC ... C08J 5/043; C08J 5/042; C08J 5/046; C08J 2311/02; C08J 2323/16; C08J 2323/22; C08J 2367/00; C08J 2375/04; C08J 2377/00
USPC ........................................... 524/494
See application file for complete search history.

(56) References Cited

U.S. PATENT DOCUMENTS

| | | | |
|---|---|---|---|
| 3,147,698 A * | 9/1964 | Ross .............. | B41N 10/04 428/304.4 |
| 4,368,568 A * | 1/1983 | Watanabe ........... | F16C 13/00 492/52 |
| 4,770,929 A | 9/1988 | Nobumasa et al. | |
| 6,204,209 B1 | 3/2001 | Rozek et al. | |
| 2008/0115871 A1 | 5/2008 | Sandstrom et al. | |
| 2010/0251908 A1 | 10/2010 | Yoshida | |
| 2016/0101542 A1* | 4/2016 | Kosaka .............. | C08L 69/00 524/537 |
| 2016/0214346 A1* | 7/2016 | Hatanaka ............ | B32B 5/18 |

FOREIGN PATENT DOCUMENTS

| | | | | |
|---|---|---|---|---|
| CN | 105492200 A | | 4/2016 | |
| EP | 0472942 A1 * | | 3/1992 | ............ D04H 1/64 |
| JP | 61-100446 A | | 5/1986 | |
| JP | 63-60743 A | | 3/1988 | |
| JP | 3-213337 A | | 9/1991 | |
| JP | 4-334439 A | | 11/1992 | |
| JP | 5-163658 A | | 6/1993 | |
| JP | 05163658 A | * | 6/1993 | |
| JP | 6-71065 A | | 3/1994 | |
| JP | 8-109566 A | | 4/1996 | |
| JP | 9-277295 A | | 10/1997 | |
| JP | 10-100324 A | | 4/1998 | |
| JP | 10-193430 A | | 7/1998 | |
| JP | 2003-169725 A | | 6/2003 | |
| JP | 2003169725 A | * | 6/2003 | |
| JP | 2004-217829 A | | 8/2004 | |
| JP | 2004217829 A | * | 8/2004 | |
| JP | 4440963 B2 | | 3/2010 | |
| JP | 2016-3257 A | | 1/2016 | |
| WO | WO 2013/129540 A1 | | 9/2013 | |
| WO | WO 2015/029634 A1 | | 3/2015 | |

OTHER PUBLICATIONS

Chinese Office Action and Search Report for Chinese Application No. 201780079552.8, dated May 21, 2021, with an English translation.

* cited by examiner

Primary Examiner — Kelechi C Egwim
(74) Attorney, Agent, or Firm — Birch, Stewart, Kolasch & Birch, LLP

(57) ABSTRACT

Provided is a structure having excellent flexibility represented by elastic restoring from compression or tensile elongation at break, and excellent lightness. A structure according to the present invention includes reinforced fibers, first plastic, and second plastic that exhibits rubber elasticity at room temperature, the reinforced fibers being discontinuous fibers, and the first plastic and/or the second plastic coating a crossing point between the reinforced fibers in contact with each other.

9 Claims, No Drawings

STRUCTURE

TECHNICAL FIELD

The present invention relates to a structure containing reinforced fibers, first plastic, and second plastic that exhibits rubber elasticity at room temperature.

BACKGROUND ART

Recently, improved rigidity and lightness are increasingly required of industrial products such as an automobile and a sport product in the market year after year. In order to meet such a requirement, fiber-reinforced plastic having excellent rigidity and lightness are being widely used for various industrial purposes. For these purposes, product development has been mainly made that adapt to a high-strength and high-rigidity member taking advantage of excellent mechanical properties of reinforced fibers. On the other hand, the fiber-reinforced plastic is recently rapidly developing its use application and is drawing attention for its use application that meets a requirement of flexibility as well as the strength and the rigidity. Development of the fiber-reinforced plastic for use application that takes advantage of such flexibility, however, has been limited only to some use application such as a molding auxiliary material, i.e., a material obtained by heat-resistance fibers with a rubber polymer (see Patent Documents 1 and 2).

PRIOR ART DOCUMENTS

Patent Documents

Patent Document 1: Japanese Patent Laid-open Publication No. 09-277295
Patent Document 2: Japanese Patent No. 4440963

SUMMARY OF THE INVENTION

Problems to be Solved by the Invention

In use application of an automobile interior material and medical care, however, there has been a problem that although flexibility and elastic restoring (cushioning characteristics) against a load are required, the methods described in Patent Documents 1 and 2 are incapable of giving a material that additionally has lightness while satisfying the elastic restoring (cushioning characteristics).

Thus, the present invention has been made in view of the above problem, and an object of the present invention is to provide a structure having an excellent compression property or tensile elongation at break as an indicator of the flexibility and having excellent lightness.

Solutions to the Problems

The present invention to solve the above problem is as follows.
(1) A structure containing reinforced fibers, first plastic, and second plastic that exhibits rubber elasticity at room temperature,
the reinforced fibers being discontinuous fibers, and
the first plastic and/or the second plastic coating a crossing point between the reinforced fibers in contact with each other.

Effects of the Invention

Regarding the structure according to the present invention, it is possible to provide a structure having an excellent compression property or tensile elongation at break and excellent lightness.

EMBODIMENTS OF THE INVENTION

Hereinafter, the structure according to the present invention is described.

The structure according to the present invention contains reinforced fibers, first plastic, and second plastic that exhibits rubber elasticity at room temperature, the reinforced fibers being discontinuous fibers, and the first plastic and/or the second plastic coating a crossing point between the reinforced fibers in contact with each other. The present invention described above has features of an appropriate compression property or tensile elongation at break and appropriate lightness, and excellent handleability.

[Reinforced Fibers]

The structure according to the present invention contains the reinforced fibers. The reinforced fibers are discontinuous fibers. Further, the discontinuous fibers are preferably dispersed in nearly monofilaments and randomly in the structure. Use of the discontinuous fibers as the reinforced fibers facilitates formation of a sheet-shaped structure precursor of the structure or the structure into a complicated shape when an external force is applied to the structure precursor or the structure for molding. The reinforced fibers are dispersed in nearly monofilaments and randomly to decrease the reinforced fibers present as fiber bundles in the structure, so that it is possible to minimize a weak portion at an end of a fiber bundle of the reinforced fibers and thus impart isotropy in addition to excellent reinforcing efficiency and reliability.

Here, the phrase "in nearly monofilaments" refers to existing as fine-denier strands having less than 500 reinforced fiber single yarns. The first reinforced fibers are further preferably dispersed in monofilaments. The state of being in monofilaments refers to a state of existing as single filaments. The reinforced fibers are further preferably dispersed randomly in single filaments as the monofilaments.

The reinforced fibers of the present invention preferably have a form of a non-woven fabric from a viewpoint of easy impregnation of the reinforced fibers with the first plastic and the second plastic. The reinforced fibers having a form of a non-woven fabric is preferable because they not only give easy handling of the non-woven fabric itself but are also capable of facilitating impregnation even when thermoplastic that is generally regarded as having high viscosity is used as the first plastic and/or the second plastic. Here, the "form of a non-woven fabric" refers to a form in which strands and/or monofilaments of the reinforced fibers are dispersed irregularly and planarly, and examples of the form include a chopped strand mat, a continuous strand mat, a paper-making mat, a carding mat, and an air-laid mat (hereinafter, these mats are collectively referred to as fiber-reinforced mats).

The reinforced fibers in the structure that have a mass average fiber length of 1 to 15 mm are preferable because they are capable of increasing their reinforcing efficiency for the structure and giving excellent mechanical properties to the structure. The reinforced fibers having a mass average fiber length of less than 1 mm are not preferable because they are incapable of efficiently forming voids in the structure to sometimes increase the density of the structure, in other words, such reinforced fibers make it difficult to obtain the structure having a desired thickness while keeping the same mass. On the other hand, the reinforced fibers having a mass average fiber length of more than 15 mm are not preferable because they are likely to be flexed by their own weight in the structure to cause inhibition of exertion of the mechanical properties.

It is possible to obtain the mass average fiber length by removing a plastic component in the structure by a method such as burning or elution, arbitrarily selecting 400 reinforced fibers from the remaining reinforced fibers, measuring the selected reinforced fibers down to a unit of 10 μm, and substituting the measured values in the following formula.

$$\text{Mass average fiber length} = \Sigma(Li \times Wi/100)$$

Li: measured fiber length (i=1, 2, 3 . . . n)
Wi: fiber mass fraction of fiber length Li (i=1, 2, 3 . . . n)

The reinforced fibers are preferably at least one type selected from the group consisting of PAN-based carbon fibers, PITCH-based carbon fibers, glass fibers, and aramid fibers, from a viewpoint of balance between the mechanical properties and lightness of the structure formed. The reinforced fibers may have been surface-treated. Examples of the surface treatment include, in addition to a treatment of depositing a metal as a conductor, a treatment with a coupling agent, a treatment with a sizing agent, a treatment with a banding agent, and a treatment of attaching an additive agent. These types of reinforced fibers may be used alone, or two or more types of reinforced fibers may be used in combination. Among these types of fibers, PAN-based, PITCH-based, or rayon-based carbon fibers that are excellent in specific strength and specific rigidity are preferably used from a viewpoint of an effect of reducing weight. Further, glass fibers are preferably used from a viewpoint of increasing economic efficiency of the structure obtained, and particularly, carbon fibers and glass fibers are preferably used in combination in terms of balance between the mechanical properties and the economic efficiency. Further, aramid fibers are preferably used from a viewpoint of increasing an impact absorbing property and formativeness of the structure obtained, and particularly, carbon fibers and aramid fibers are preferably used in combination in terms of balance between the mechanical properties and the impact absorbing property. Further, it is also possible to use reinforced fibers coated with a metal such as nickel, copper, or ytterbium from a viewpoint of increasing conductivity of the structure obtained. Among these types of fibers, it is possible to more preferably use PAN-based carbon fibers excellent in mechanical properties such as strength and elastic modulus.

The reinforced fibers having a tensile elongation at break in a range of 1% or more and 10% or less are preferable because they are capable of forming the structure having a tensile elongation at break of 1% or more. The reinforced fibers having a tensile elongation at break of 1% or more are preferable because they enable the structure formed to take advantage of the rubber elasticity of the second plastic and are capable of forming the structure that is ductile. On the other hand, the reinforced fibers having a tensile elongation at break of 10% or less is preferable because it is capable of preventing itself from being excessively flexible and has excellent handleability.

It is possible to obtain the tensile elongation at break of the reinforced fibers according to JIS R7606 (2000). In measuring the tensile elongation at break, when the reinforced fibers are formed of fiber bundles that are formed by bundling a plurality of single filaments, one (single filament) of the plurality of single filaments is pulled out and subjected to measurement to obtain the tensile elongation at break of the reinforced fibers.

[First Plastic]

The structure according to the present invention contains the first plastic. Here, the first plastic of the present invention is plastic other than the second plastic described later, that is, plastic that exhibits no rubber elasticity at room temperature. Examples of such first plastic include thermoplastic and thermosetting plastic other than the second plastic. In the present invention, thermosetting plastic may be blended with thermoplastic.

The first plastic fixes discontinuous fibers as the reinforced fibers to have an effect of improving the handling performance of the reinforced fibers when the reinforced fibers are combined with the second plastic. Further, the first plastic sometimes has an effect of increasing the affinity between the second plastic and the reinforced fibers.

The first plastic preferably has a softening point or melting point of 50° C. or higher. The first plastic having a softening point or melting point of 50° C. or higher never causes its melting and loss due to impregnation temperature for impregnating, with the second plastic, the reinforced fibers having the first plastic applied thereto or due to molding temperature for molding the structure, so that the first plastic never inhibits a cross-linking reaction or a vulcanization reaction that can be caused by the second plastic. On the other hand, the second plastic that is thermoplastic is capable of reducing melting and loss of the first plastic at impregnation temperature.

The content of the first plastic is preferably 5 parts by mass or more and 25 parts by mass or less relative to 100 parts by mass of the reinforced fibers, from a viewpoint of improving the handling performance of the reinforced fibers described above and from a viewpoint of improving the affinity between the second plastic and the reinforced fibers described above. With the content of the first plastic less than 5 parts by mass relative to 100 parts by mass of the reinforced fibers, the handling performance of the reinforced fibers is deteriorated. With the content of the first plastic more than 25 parts by mass, the first plastic blocks an infiltration route of the second plastic to be impregnated into the reinforced fibers, to sometimes make it difficult to obtain the structure. The first plastic may be water-soluble or emulsion from a viewpoint of industrially easy application of the first plastic to the reinforced fibers.

[Second Plastic]

The structure according to the present invention contains the second plastic. Here, the second plastic of the present invention is plastic that exhibits rubber elasticity at room temperature. The phrase "the plastic exhibits rubber elasticity at room temperature" refers to a plastic's feature of being deformed under room temperature and returning to its original shape after a stress required for the deformation is released. Specifically, a No. 1 dumbbell-shaped test piece described in JIS K6400 (2012) is subjected to extension and a stress required for the extension is released. Exhibiting rubber elasticity refers to elastic restoration to almost the original length after the release of the stress. The plastic, however, is not necessarily completely restored to its original length but may have a dimensional change of 80% or more and 120% or less, preferably 90% or more and 150% or less after the stress required for the extension is released, with the dimension before the extension defined as 100%. The room temperature means 25° C.

The second plastic preferably contains at least one type selected from the group consisting of silicone rubber, ethylene propylene rubber, acrylonitrile butadiene rubber, chloroprene rubber, fluororubber, a polyolefin-based thermoplastic elastomer, a polyurethane-based thermoplastic elastomer, a polyester-based thermoplastic elastomer, and a polyamide-based thermoplastic elastomer. Use of the second plastic gives excellent cushioning characteristics of the structure against compression. Thermosetting plastic as the second plastic is, for easy manufacturing, preferably liquid before a cross-linking or vulcanization reaction. From such a viewpoint, it is possible to preferably use silicone rubber or fluororubber. The second plastic that is thermoplastic is preferable from a viewpoint of manufacturing the structure because it has a melting temperature or softening temperature and enables formation of a film. From such a viewpoint, preferably exemplified is a polyester-based thermoplastic elastomer.

The first plastic and the second plastic in the structure according to the present invention may contain an impact resistance improver such as an elastomer or a rubber component, or another filler or additive agent in a range without impairing the object of the present invention. Examples of the filler and the additive agent include an inorganic filler, a flame retardant, a conductivity imparting agent, a nucleating agent, an ultraviolet absorbing agent, an antioxidant, a damping agent, an antibacterial agent, a bug repellent, a deodorant, a coloring inhibitor, a thermostabilizer, a mold release agent, an antistatic agent, a plasticizer, a lubricant, a coloring agent, a pigment, a dye, a foaming agent, a defoamer, and a coupling agent.

In the structure according to the present invention, a crossing point between reinforced fibers in contact with each other (hereinafter, the crossing point between reinforced fibers is described as a crossing point) is preferably coated with the first plastic and/or the second plastic.

The first plastic and/or the second plastic at the crossing point between reinforced fibers preferably has a coating thickness in a range of 1 µm or more and 15 µm or less from a viewpoint of allowing the structure to exert elastic restoring from compression. A coat state of the crossing point coated with the first plastic and/or the second plastic is sufficient as long as it is attained by coating at least a point at which single filaments of the reinforced fibers contained in the structure cross with each other from viewpoints of shape stability and exertion of the compression property of the structure. As a further preferable aspect, however, the first plastic and/or the second plastic preferably gives a coat state with the above thickness on the periphery of the crossing point. This state means a state in which a surface of the crossing point between reinforced fibers is unexposed due to the first plastic and/or the second plastic, in other words, a state in which the reinforced fibers have a wire-shaped coating film formed thereon by the first plastic and/or the second plastic. This allows the structure to further have shape stability and sufficiently exert the mechanical properties. As a coat proportion of crossing points coated with the first plastic and/or the second plastic, the reinforced fibers are not necessarily coated at all the crossing points thereof and may only be coated in a range without impairing the shape stability and the compression modulus of the structure according to the present invention. The reinforced fibers are coated preferably at 50% or more of the crossing points formed between reinforced fibers in contact with each other, further preferably at 80% or more from a viewpoint of stability of exertion of the elastic restoring from compression.

Here, the plastic coating the crossing point between reinforced fibers may be either one of the first plastic and the second plastic, or the crossing point may be coated with both the first plastic and the second plastic. Preferably, the reinforced fibers that are coated with the first plastic and then further coated with the second plastic are preferable from viewpoints of handleability of the reinforced fibers and of allowing the structure formed to effectively exert the elastic restoring from compression.

It is possible to measure the coat state by cutting the structure into a piece and observing a section of the piece with a device that allows observation at high magnification, such as a scanning electron microscope (SEM). For example, it is possible to observe and image the section at a magnification of 3000 times with an SEM and measure the coating thickness of the first plastic and/or the second plastic coating crossing points between reinforced fibers at any 50 locations showing cut sections of the reinforced fibers in the obtained image. A representative value of the thickness of the first plastic and/or the second plastic coating the crossing points is obtained by deriving an arithmetic average value of the measurement results at the 50 locations. In the measurement, it is possible to obtain a further precise measurement result by preliminarily observing and imaging the reinforced fibers having no second plastic applied thereto (a crossing point of reinforced fibers that is bound by the first plastic as described above) in the same manner as above to obtain the diameter of the crossing point, and obtaining a value by subtracting the diameter of the crossing point from a diameter of a crossing point obtained from an image of the reinforced fibers having the second plastic applied thereto. As the diameter of the crossing point, a maximum diameter of a section of the crossing point in the observation field is obtained. Fiber diameters perpendicular to the obtained maximum diameter are measured, and an arithmetic average of the measured values of the diameters are defined as the diameter of the crossing point as well as the crossing point coated with the first plastic and/or the second plastic.

It is possible to measure the coat proportion by cutting the structure into a piece and observing a section of the piece with a device that allows observation at high magnification, such as a scanning electron microscope (SEM). For example, it is possible to calculate the coat proportion representing the proportion of crossing points coated with the first plastic and/or the second plastic, by observing and imaging the section at a magnification of 1000 times with an SEM and dividing the number of crossing points coated with the first plastic and/or the second plastic among any 400 locations observed in the obtained image by the number of crossing points measured (that is, 400). It is possible to obtain the coat proportion with less than 400 locations. The measurement with 400 or more locations, however, is preferable to decrease an error between measurers.

The second plastic having a tensile elongation at break of 200% or more and a tensile strength at break of 10 MPa or more is preferable because it is capable of forming the structure having a tensile elongation at break of 1% or more. On the other hand, the second plastic having a tensile elongation at break of 200% or more is sufficient in fracture elongation and is thus capable of preventing the structure from being brittle. The second plastic more preferably has a tensile elongation at break of 500% or more. On the other hand, the second plastic having a tensile strength at break of 10 MPa or more is capable of forming the structure having desired sufficient elastic restoring from compression. The second plastic more preferably has a tensile strength at break of 25 MPa or more.

It is possible to obtain the tensile elongation at break and the tensile strength at break of the second plastic according to a tensile test (JIS K6400 (2012)).

[Structure]

The structure according to the present invention preferably contains voids. Further, the structure preferably has a density of 0.01 g/cm³ or more and 1.3 g/cm³ or less. The structure having a density p of 1.3 g/cm³ or less is preferable because it prevents an increase in mass of itself and is capable of securing lightness. The structure having a density of 0.01 g/cm³ or more is excellent in density of itself and is capable of preventing an excessive decrease in volume proportion of the reinforced fibers and the plastic component (the first plastic and the second plastic) in the structure. Therefore, the structure having such a density is preferable because it is balanced between the elastic restoring and the tensile strength. The structure has a density of preferably 0.03 g/cm³ or more from the above viewpoint, preferably 0.1 g/cm³ or more in further consideration of balance among the lightness, the elastic restoring, and the tensile strength.

The structure according to the present invention preferably has a volume content of the voids in a range of 10 vol % or more and 97 vol % or less, with the volume content of the structure defined as 100 vol %. The structure having a volume content of the voids of 10 vol % or more is preferable because it satisfies the lightness of itself. On the other hand, the structure having a volume content of the voids of 97 vol % or less is preferable because such a structure, in other words, the structure that secures sufficient thickness of the plastic component (the first plastic and the second plastic) coating the periphery of the reinforced fibers and allows sufficient mutual reinforcement of the reinforced fibers in the structure is capable of improving the mechanical properties.

Here, the voids refer to spaces formed by the plastic component (the first plastic and the second plastic)-coated reinforced fibers being columnar supporting bodies and overlapping or crossing with each other. For example, when the reinforced fibers are impregnated with the plastic component (the first plastic and the second plastic) in advance to form a structure precursor and the structure precursor is heated to give the structure, melting or softening of the plastic component (the first plastic and the second plastic) by the heating raises the reinforced fibers to form the voids. This phenomenon is based on the reinforced fibers' character of rising by a rising force derived from the elastic modulus of the reinforced fibers that have been compressed by pressure in the structure precursor.

As regards the volume content in the present invention, a total of the volume contents of the plastic (a total of the first plastic and the second plastic), the reinforced fibers, and the voids contained in the structure is defined as 100 vol %.

That is, with the total of the plastic (the total of the first plastic and the second plastic), the reinforced fibers, and the voids defined as 100 vol %, the structure preferably has a volume content of the plastic (the total of the first plastic and the second plastic) in a range of 2.5 vol % or more and 85 vol % or less. The structure having a volume content of the plastic (the total of the first plastic and the second plastic) of 2.5 vol % or more is preferable because it allows the reinforced fibers in the structure to be bound with each other to be capable of making a reinforcing effect of the reinforced fibers sufficient and thus satisfying the mechanical properties, particularly a flexural property of the structure. On the other hand, the structure having a volume content of the plastic (the total of the first plastic and the second plastic) of 85 vol % or less is preferable because it easily has a void configuration for its small amount of the plastic.

Further, the structure according to the present invention preferably has an elastic restoring from 50% compression of 1 MPa or more. Here, the elastic restoring is measured according to JIS K7220 (2006) and is compression strength when the structure is compressed by 50% along its thickness direction. The structure having an elastic restoring from thickness-wise 50% compression of 1 MPa or more is excellent in shape retention and is thus excellent in handling performance, for example, when it is as a product, attached to another member. Further, the structure having such an elastic restoring is preferable from a viewpoint of protecting a worker during attachment of the structure used as a product, because it is capable of enduring a small load when used in practical application, with the in-plane direction thereof used as a loading direction, and further, it is deformed with a certain load applied. The structure having an elastic restoring from 50% compression of 1 MPa or more suffices for practical application. The structure, however, preferably has an elastic restoring from 50% compression of 3 MPa or more.

Further, the structure preferably has a tensile elongation at break in a range of 1% or more and 20% or less. Here, the tensile elongation at break is measured according to JIS K6400 (2012) and is elongation at break observed in a tensile test for the structure performed along the fiber orientation direction of the structure. The fiber orientation direction means a length direction of the reinforced fibers. The structure having a tensile elongation at break of 1% or more and 20% or less produces less flexure and twist when handled, to be excellent in handling performance. The structure has a tensile elongation at break of preferably 3% or more and 15% or less, further preferably 5% or more and 15% or less from a viewpoint of handleability.

A method for manufacturing the structure according to the present invention enables manufacturing of the structure through a first structure precursor obtained by impregnating mat-shaped reinforced fibers (hereinafter, simply referred to as a fiber-reinforced mat) with the first plastic in advance. As a method for manufacturing the first structure precursor, it is preferable to use a method for laminating the fiber-reinforced mat and the first plastic to form a laminated product, applying pressure on the laminated product with the first plastic melted or heated at its softening temperature or higher, and thus impregnating the fiber-reinforced mat with the first plastic, from a viewpoint of easy manufacturing. On the other hand, it is also possible to employ a method for adding the first plastic, which has a form of an aqueous solution or emulsion, to the fiber-reinforced mat through, for example, curtain coating, dipping, or immersion and drying moisture and a solvent component. Any method is employable as long as it is means capable of applying the first plastic to the fiber-reinforced mat.

It is possible to manufacture the structure through a second structure precursor obtained by impregnating the first structure precursor with the second plastic. It is possible to perform a method for applying the second plastic to the first structure precursor by further impregnating the first structure precursor with the second plastic. For example, when the second plastic is thermoplastic, it is preferable to use a method for laminating the first structure precursor and the second plastic to form a laminated product, applying pressure on the laminated product with the second plastic melted or heated at its softening temperature or higher, and thus impregnating the fiber-reinforced mat as the first structure precursor with the second plastic, from a viewpoint of easy manufacturing. Specifically, preferable examples of the method include a method for performing melt impregnation by heating and pressing a laminated product obtained by disposing the second plastic on both thickness-wise sides of the first structure precursor. As equipment for implementing the above methods, it is possible to suitably use a compression molding machine or a double belt press. The former is used for a batch-type method, and it is possible to improve the productivity by employing an intermittent-type press system including two or more machines for heating and cooling in combination. The latter is used for a continuous-type method which enables easy continuous processing to be excellent in continuous productivity.

When the second plastic is dispersed in a solvent or is liquid at room temperature, it is possible to obtain the structure by a method for allowing the second plastic to penetrate into the first structure precursor through, for example, curtain coating, dipping, immersion, or vacuum pressure molding, and for drying moisture and a solvent component, or a method for heating the first structure precursor, into which the second plastic has been allowed to penetrate, at a temperature for starting a cross-linking reaction or a vulcanization reaction of the second plastic.

The structure according to the present invention is preferably used for an automobile interior or exterior part, an electric or electronic device housing, a bicycle, a structure material for sport goods, an aircraft interior material, and a constituent component for, for example, a medical device, from viewpoints of elastic restoring from compression and lightness. In particular, the composite structure is especially suitable for a module member consisting of a plurality of components.

EXAMPLES

Hereinafter, the present invention is further specifically described by way of examples.

(1) Volume Content of Voids in Structure

A 10-mm square test piece was cut out from the structure, a section of the test piece was observed with a scanning electron microscope (SEM) (S-4800 type, manufactured by Hitachi High-Technologies Corporation), and the surface of the structure was imaged at 10 locations with an equal interval at a magnification of 1000 times. A void area $A_a$ in each of the images was obtained. A percentage of the voids was calculated by dividing the void area $A_a$ by the area of the entire image. The volume content of the voids in the structure was obtained by an arithmetic average of percentages of the voids at a total of 50 locations, 10 locations in each of 5 test pieces.

(2) Density of Structure

A test piece was cut out from the structure and the apparent density of the structure was measured with reference to JIS K7222 (2005). The dimension of the test piece was 100-mm square. The length, width, and the thickness of each of the test pieces were measured by a micrometer, and a volume V of the test piece was calculated from the obtained values. In addition, a mass M of the cut-out test piece was measured by an electronic balance. The obtained mass M and volume V were substituted in the following formula to calculate a density p of the structure.

$\rho$ [g/cm$^3$]=10$^3 \times M$ [g]/$V$ [mm$^3$]

(3) Elastic Restoring from 50% Compression of Structure

A test piece was cut out from the structure and the compression property of the structure was measured with reference to JIS K7220 (2006). The test piece was cut out at a length of 25±1 mm and a width of 25±1 mm. The obtained test piece was measured for its compression property using a universal tester. In the measurement, a compression strength $\sigma_m$ was calculated by the following formula using a maximum force $F_m$ at a deformation rate of 50% and a bottom sectional area $A_0$ of the test piece before the test, and the calculated value was defined as the elastic restoring. Used as a measuring device was an "INSTRON (registered trademark)" 5565 type universal material testing machine (manufactured by INSTRON JAPAN Co., Ltd.).

$\sigma_m$ [MPa]=$F_m$ [N]/$A_0$ [mm$^2$]

(4) Tensile Elongation at Break of Structure

A test piece was cut out from the structure and the tensile property of the structure was measured with reference to JIS K6400 (2012). The test piece was cut out in the No. 1 shape. The obtained test piece was measured for its tensile property using a universal tester. Used as a measuring device was an "INSTRON (registered trademark)" 5565 type universal material testing machine (manufactured by INSTRON JAPAN Co., Ltd.).

(5) Coating Thickness of Plastic in Structure

The structure was cut out into a 10-mm square test piece, a section of the test piece was observed with a scanning electron microscope (SEM) (S-4800 type manufactured by Hitachi High-Technologies Corporation), and any 10 locations were imaged at a magnification of 3000 times. The coating thickness of the plastic coating crossing points of the reinforced fibers was measured at any 50 locations showing cut sections of the crossing points of the reinforced fibers in the obtained images, and an arithmetic average of the 50 locations is defined as the coating thickness of the plastic.

(6) Content of First Plastic Relative to Reinforced Fibers

The reinforced fibers that had not been coated with the first plastic were cut at a length of 25±1 mm and a width of 25±1 mm and measured for their mass W1. Thereafter, the reinforced fibers having the first plastic contained therein were measured for their mass W2. A content of the first plastic Wr was calculated by the following formula and the amount of the first plastic per 100 parts by mass of the reinforced fibers was calculated.

Content of first plastic relative to reinforced fibers
$Wr$ (mass)=$W2-W1$ (7) Softening Point or Melting Point of First Plastic The melting point was evaluated by a differential scanning calorimeter (DSC). A sample in an amount of 5 mg was placed in a sealing sample container, the temperature was raised from 30° C. to 300° C. at a temperature rise rate of 10° C./min, and the sample was evaluated. As an evaluation device, PyrisIDSC manufactured by PerkinElmer was used.

When it was difficult to evaluate the first plastic by the melting point (when the first plastic had no melting point), the first plastic was evaluated for its Vicat softening temperature in accordance with ISO306 (2004) (using a force of 10 N), and the evaluation result was defined as the softening point.

(8) Tensile Property of Second Plastic

The second plastic was subjected to a tensile test performed with reference to a method described in JIS K6400 (2012) and evaluated for its tensile elongation at break and tensile strength at break. The obtained test piece was measured for its tensile property using a universal tester. Used as a measuring device was an "INSTRON (registered trademark)" 5565 type universal material testing machine (manufactured by INSTRON JAPAN Co., Ltd.).

The second plastic was determined to be rubber elastic or anelastic by the test performed by releasing a stress at 200% extension (with the length of the test piece defined as the standard 100%) and confirming by visual inspection whether the second plastic returned its shape to 150% or less. When returning its shape to 150% or less, the second plastic was determined to be "rubber elastic," whereas when returning its shape to more than 150% or broken, the second plastic was determined to be "anelastic."

The test piece was produced in the No. 1 dumbbell-shaped test piece shape and subjected to the test. As regards the second plastic that was thermoplastic, the test piece was produced by injection molding. As regards the second plastic that exhibited liquid property at room temperature, the test piece was produced by casting the second plastic into a mold having a recess with the same shape as the No. 1 dumbbell-shaped test piece, closing the mold, and then curing the second plastic at a temperature/time for cross-linking or curing.

(9) Volume Content of Reinforced Fibers in Structure Vf

After a mass of the structure Ws was measured, the structure was heated in air at 500° C. for 30 minutes to burn off its plastic component, a mass of the remaining reinforced fibers Wf was measured, and the volume content of the reinforced fibers was calculated by the following formula. At this time, used as the densities of the reinforced fibers and the plastic were measurement results obtained by a weight measurement method in liquid in JIS Z8807 (2012).

$$Vf \text{ (vol \%)} = (Wf/\rho f) / \{Wf/\rho f + (Ws - Wf)/\rho r\} \times 100$$

ρf: density of reinforced fibers (g/cm³)
ρr: density of plastic (g/cm³)

(10) Volume Content of First Plastic

A structure precursor only formed of the reinforced fibers and the first plastic was produced, and the volume content of the first plastic was obtained by the following formula using a value of the volume content of the voids in the precursor obtained in the same manner as in (1) and using a value of the volume content of the reinforced fibers.

$$Vr1 \text{ of first plastic (vol \%)} = 100 - (Vf + Va)$$

Vf: volume content of reinforced fibers (vol %)
Va: volume content of voids (vol %)
Vr1: volume content of first plastic (vol %)

(11) Volume Content of Second Plastic

The volume content of the second plastic was obtained by the following formula using values of the volume content of the voids, the volume content of the reinforced fibers, and the volume content of the first plastic in the structure that were obtained in (1), (9), and (10).

$$Vr2 \text{ of second plastic (vol \%)} = 100 - (Vf + Va + Vr1)$$

Vf: volume content of reinforced fibers (vol %)
Va: volume content of voids (vol %)
Vr2: volume content of second plastic (vol %)

(12) Plastic Coat Proportion in Structure

The structure was cut out into a 10-mm square test piece, a section of the test piece was observed with a scanning electron microscope (SEM) (S-4800 type manufactured by Hitachi High-Technologies Corporation), and any 10 locations were imaged at a magnification of 1000 times. As regards crossing points of the reinforced fibers, any 40 locations of the obtained images were measured for the number of crossing points of the reinforced fibers and the number of plastic-coated locations among the crossing points of the reinforced fibers, and a value obtained by the following formula was defined as the plastic coat proportion (%).

$$\text{Plastic coat proportion (\%)} = (C2/C1) \times 100$$

C1: number of crossing points measured (pieces)
C2: number of crossing points coated with plastic among C1 (pieces)

The following materials were used in the following examples and comparative examples.

[Carbon Fibers]

A copolymer containing polyacrylonitrile as a main component was subjected to spun processing, calcined processing, and surface oxidation treatment processing, and a total of 12,000 single yarns were obtained as continuous carbon fibers. The properties of the continuous carbon fibers were as follows.

Specific gravity: 1.8
Tensile strength: 4600 MPa
Tensile elastic modulus: 220 GPa
Tensile elongation at break: 2.1%

[Aramid Fibers]

Aramid fibers ("Kevlar" (registered trademark) 29 manufactured by DU PONT-TORAY CO., LTD.)

Specific gravity: 1.44
Tensile strength: 2900 MPa
Tensile elastic modulus: 70 GPa
Tensile elongation at break: 3.6%

[Polyamide]

As the first plastic, water-soluble polyamide plastic ("AQ nylon" (registered trademark) P-70 from Toray Industries, Inc.) was used.

Softening point: 85° C.

[Polyurethane]

As the first plastic, a polyurethane water dispersion ("SUPERFLEX" (registered trademark) 150 from DKS Co., Ltd.) was used.

Softening point: 195° C.
Melting point: 212° C.

[Polyester Plastic]

A plastic film was produced that was formed of polyester plastic ("Hytrel" (registered trademark) SB754 manufactured by Toray Industries, Inc.) with a weight per unit area of 121 g/m², and the plastic film was used as the second plastic. Table 1 shows the properties of the obtained plastic film.

[Silicone Rubber]

Silicone rubber (RBL-9200-40 manufactured by Dow Toray Co., Ltd.) was used. An A agent (main agent) and a B agent (curing agent) of the silicone rubber were mixed at a mixing ratio of 1:1, an amount of 124 g/m² was extracted and stirred to produce the silicone rubber, which was used as the second plastic. Table 1 shows the properties of the silicone rubber.

[Epoxy Plastic]

An uncured epoxy plastic composition was prepared by heating and kneading, with a kneader, epoxy plastic (30 parts by mass of "EPIKOTE" (registered trademark) 828, 35 parts by mass of "EPIKOTE" (registered trademark) 1001, and 35 parts by mass of "EPIKOTE" (registered trademark) 154 from Japan Epoxy Resins Co., Ltd.) and 5 parts by mass of thermoplastic polyvinyl formal ("Vinylec" (registered trademark) K from CHISSO CORPORATION) to uniformly dissolve polyvinyl formal, and then kneading, with a kneader, 3.5 parts by mass of a curing agent dicyandiamide (DICY7 from Japan Epoxy Resins Co., Ltd.) and 7 parts by mass of a cure accelerator 4,4-methylenebis(phenyldimethylurea) ("OMICURE" (registered trademark) 52 from PTI Japan Limited). A plastic film with a weight per unit area of 132 g/m² was produced from the uncured epoxy plastic composition with a knife coater, and the plastic film was used as the second plastic. Table 1 shows the properties of the obtained plastic film.

Example 1

With use of the carbon fibers as the reinforced fibers, the carbon fibers were cut with a strand cutter at 6 mm to give chopped carbon fibers. A dispersion liquid formed of water and a surfactant (polyoxyethylene lauryl ether (trade name) manufactured by NACALAI TESQUE, INC.) at a concentration of 0.1 mass % was prepared, and a fiber-reinforced mat was manufactured with use of the dispersion liquid and the chopped carbon fibers. A manufacturing device includes, as a dispersing tank, a 1000-mm diameter cylinder-shaped container having an opening cock at a lower portion of the container, and includes a linear transport part (inclination angle: 30°) connecting the dispersing tank to a paper-making tank. A stirrer is attached to an opening on an upper surface of the dispersing tank, and it is possible to charge the chopped carbon fibers and the dispersion liquid (dispersion medium) through the opening into the dispersing tank. The paper-making tank includes a mesh conveyor having a 500-mm wide paper-making surface at the bottom and has the mesh conveyor thereof connected to a conveyor capable of delivering a carbon fiber substrate (paper-making substrate). Paper making was performed with the concentration of the carbon fibers in the dispersion liquid set at 0.05 mass %. The fiber-reinforced mat produced by the paper making was dried in a dry furnace at 200° C. for 30 minutes to give a fiber-reinforced mat. The weight per unit area of the mat was 50 g/m$^2$.

The polyamide as the first plastic was dissolved in water to give a concentration of 1 mass %. The aqueous polyamide solution was applied to the fiber-reinforced mat obtained above. The fiber-reinforced mat having the aqueous polyamide solution applied thereto was put in a hot air oven whose temperature was adjusted to 110° C. and dried for 2 hours to give a first structure precursor. The attachment rate of the polyamide to the obtained first structure precursor was 10 parts by mass relative to 100 parts by mass of the fiber-reinforced mat.

A laminated product was produced by disposing the polyester plastic as the second plastic on the first structure precursor in an order of [second plastic/first structure precursor/second plastic/first structure precursor/second plastic/first structure precursor/second plastic/first structure precursor/first structure precursor/second plastic/first structure precursor/second plastic/first structure precursor/second plastic/first structure precursor/second plastic]. Next, the laminated product was subjected to the following steps (1) to (5) to give a structure. Table 2 shows the properties of the structure.
(1) The laminated product is disposed in a press-molding mold cavity that has been preliminarily heated at 200° C. and the molds are closed.
(2) Next, the molds are retained for 120 seconds and then further retained for 60 seconds while pressed at a pressure of 3 MPa.
(3) After the step (2), the mold cavity is opened and a metal spacer is inserted at an end of the cavity to adjust the thickness of an obtained structure to 3.4 mm.
(4) Thereafter, the mold cavity is closely closed again, and the molds are cooled to a cavity temperature of 50° C. while the pressure is retained.
(5) The molds are opened and a structure is extracted.

Example 2

A laminated product was obtained that was the same as that of Example 1 except for having a content of the first plastic of 8 parts by mass, and next, the laminated product was subjected to the following steps (1) to (4) to give a structure. Table 2 shows the properties of the structure.
(1) The laminated product is disposed in a press-molding mold cavity that has been preliminarily heated at 200° C. and the molds are closed.
(2) Next, the molds are further retained for 120 seconds while pressed at a pressure of 3 MPa.
(3) Thereafter, the molds are cooled to a cavity temperature of 50° C. while the pressure is retained.
(4) The molds are opened and a structure is extracted.

Example 3

A laminated product was obtained that was the same as that of Example 1 except for containing as the first plastic the polyurethane instead of the polyamide, having a content of the first plastic of 10 parts by mass, and having a mass proportion of the reinforced fibers in the structure of 55 mass %, and next, the laminated product was subjected to the following steps (1) to (5) to give a structure. Table 2 shows the properties of the structure.
(1) The laminated product is disposed in a press-molding mold cavity that has been preliminarily heated at 200° C. and the molds are closed.
(2) Next, the molds are retained for 120 seconds and then further retained for 60 seconds while pressed at a pressure of 3 MPa.
(3) After the step (2), the mold cavity is opened and a metal spacer is inserted at an end of the cavity to adjust the thickness of an obtained structure to 5.9 mm.
(4) Thereafter, the mold cavity is closely closed again, and the molds are cooled to a cavity temperature of 50° C. while the pressure is retained.
(5) The molds are opened and a structure is extracted.

Example 4

In Example 4, the second plastic was changed from the polyester plastic to the silicone rubber. Eight pieces of the first structure precursors used in Example 1 were laminated and stored in a stainless steel container into which the silicone rubber was charged, and the first structure precursors were stroked with a hand roller until impregnated with the silicone rubber, to produce a laminated product. Next, the laminated product was subjected to the following steps (1) to (4) to give a structure. Table 2 shows the properties of the structure.
(1) The laminated product is disposed in a press-molding mold cavity that has been preliminarily heated at 150° C. and the molds are closed.
(2) Next, the molds are further retained for 60 minutes while pressed at a pressure of 3 MPa.
(3) Thereafter, the molds are cooled to a cavity temperature of 30° C. while the pressure is retained.
(4) The molds are opened and a structure is extracted.

Example 5

A laminated product was obtained in the same manner as in Example 4. Next, the laminated product was subjected to the following steps (1) to (4) to give a structure. Table 2 shows the properties of the structure.
(1) The laminated product is disposed in a press-molding mold cavity that has been preliminarily heated at 150° C.
(2) Next, a metal spacer is inserted at an end of the mold cavity to adjust the thickness of an obtained structure to 3.3 mm, and the molds are closed then retained for 10 minutes.
(3) Thereafter, the molds are cooled to a cavity temperature of 30° C. while the pressure is retained.
(4) The molds are opened and a structure is extracted.

Example 6

A first structure precursor was obtained in the same manner as in Example 1. A structure was obtained in the same manner as in Example 1 except that the laminated product was obtained by adjusting the amount of the second plastic to give a mass proportion of the reinforced fibers of 55 mass % in the structure. Table 2 shows the properties of the structure.

Example 7

A structure was obtained in the same manner as in Example 1 except that the reinforced fibers were changed from the carbon fibers to the aramid fibers, the first plastic was changed from the polyamide to the polyurethane, and the mass proportion of the aramid fibers in the structure was changed to 25 mass %. Table 2 shows the properties of the structure.

Example 8

A structure was obtained in the same manner as in Example 2 except that the reinforced fibers were changed from the carbon fibers to the aramid fibers, the first plastic was changed from the polyamide to the polyurethane, the content of the first plastic was changed to 10 parts by mass, and the mass proportion of the aramid fibers in the structure was changed to 25 mass %. Table 2 shows the properties of the structure.

Comparative Example 1

A laminated product was obtained that was the same as that of Example 1 except for having a content of the first plastic of 8 parts by mass and containing as the second plastic the epoxy plastic instead of the polyester plastic, and next, the laminated product was subjected to the following steps (1) to (4) to give a structure. Table 3 shows the properties of the laminate.
(1) The laminated product is disposed in a press-molding mold cavity that has been preliminarily heated at 150° C. and the molds are closed.
(2) Next, the molds are further retained for 10 minutes while pressed at a pressure of 3 MPa.
(3) Thereafter, the molds are cooled to a cavity temperature of 50° C. while the pressure is retained.
(4) The molds are opened and a structure is extracted.

Comparative Example 2

A laminated product was formed by changing the first plastic from the polyamide to the polyurethane and adjusting the content of the first plastic to 30 parts by mass relative to the reinforced fibers. Next, the laminated product was subjected to the following steps (1) to (4) to give a structure. Table 3 shows the properties of the laminate.
(1) The laminated product is disposed in a press-molding mold cavity that has been preliminarily heated at 150° C.
(2) Next, a metal spacer is inserted at an end of the mold cavity to adjust the thickness of an obtained structure to 1.5 mm, and the molds are closed then retained for 10 minutes.
(3) Thereafter, the molds are cooled to a cavity temperature of 50° C. while the pressure is retained.
(4) The molds are opened and a structure is extracted.

Comparative Example 3

A laminated product was produced by changing the reinforced fibers from the carbon fibers to the aramid fibers, using no first plastic, and using the epoxy plastic as the second plastic. Next, the laminated product was subjected to the following steps (1) to (4) to give a structure. Table 3 shows the properties of the laminate.
(1) The laminated product is disposed in a press-molding mold cavity that has been preliminarily heated at 150° C. and the molds are closed.
(2) Next, the molds are further retained for 10 minutes while pressed at a pressure of 3 MPa.
(3) Thereafter, the molds are cooled to a cavity temperature of 50° C. while the pressure is retained.
(4) The molds are opened and a structure is extracted.

[Study]

Examples 1, 3, and 5 to 7 gave a result that as regards the structure containing the reinforced fibers, the first plastic, and the second plastic that exhibits rubber elasticity at room temperature, when the structure contains discontinuous fibers as the reinforced fibers and the second plastic coats the crossing point between reinforced fibers that is bound by the first plastic, the structure has an elastic restoring from 50% compression of 1 MPa or more and a tensile elongation of 1% or more in any cases. Also in Examples 2, 4, and 8 in which the elastic restoring from 50% compression was unmeasurable due to a small percentage of voids, their structures were clarified to have excellent tensile elongation at break in comparison with the structures of Comparative Examples 1 and 3 and clarified to have both excellent flexibility and lightness. Comparison of Examples 1 to 8 with Comparative Example 3 affirmed that coating the reinforced fibers with the first plastic prevents the mat formed of the reinforced fibers from going to pieces during conveyance and makes the mat excellent in handleability. In Comparative Examples 1 and 3, the structure contained as the second plastic the epoxy plastic that had no rubber elasticity at room temperature, so that the structure never exhibited elastic restoring from 50% compression. The structure of Comparative Example 1 had a tensile elongation of 1% or more. The structure, however, had no voids, so that such a tensile elongation was considered to be a reflection of the tensile elongation of the reinforced fibers. Examples 3 and 7 were capable of giving structures having an appropriate tensile elongation at break even though the type of the reinforced fibers was changed. The above results make it clear that the structure in the scope of the present invention has an excellent compression property and an excellent tensile property.

TABLE 1

| Type | — | Polyester plastic | Silicone rubber | Epoxy plastic |
|---|---|---|---|---|
| Density | g/cm³ | 1.09 | 1.13 | 1.20 |
| Melting point | ° C. | 160 | — | — |
| Softening point | ° C. | 55 | — | — |
| Rubber elasticity | Rubber elastic or anelastic | Rubber elastic | Rubber elastic | Anelastic |
| Tensile elongation at break | % | 900 | 580 | 10 |
| Tensile strength at break | MPa | 10 | 10 | 60 |

TABLE 2

|  |  | Example 1 | Example 2 | Example 3 | Example 4 |
|---|---|---|---|---|---|
| Reinforced fibers | Type | Carbon fibers | Carbon fibers | Carbon fibers | Carbon fibers |
| Tensile elongation at break | % | 2.1 | 2.1 | 2.1 | 2.1 |
| First plastic | Type | Polyamide | Polyamide | Polyurethane | Polyamide |
| Softening point | ° C. | 85 | 85 | 195 | 85 |
| Melting point | ° C. | — | — | 212 | — |
| Amount relative to 100 parts by mass of reinforced fibers | Parts by mass | 10 | 8 | 10 | 8 |
| Second plastic | Type | Polyester plastic | Polyester plastic | Polyester plastic | Silicone rubber |
| Coating of crossing point between reinforced fibers | Present or absent | Present | Present | Present | Present |
| Coating thickness of first plastic and second plastic | μm | 4.8 | 4.8 | 2.0 | 4.8 |
| Structure | — |  |  |  |  |
| Density | g/cm³ | 0.40 | 1.23 | 0.23 | 1.27 |
| Volume content of voids | Vol % | 66.7 | 0 | 83.3 | 0 |
| Volume content of total of reinforced fibers and first plastic | Vol % | 6.8 | 20.4 | 7.3 | 21.2 |
| Volume content of second plastic | Vol % | 26.5 | 79.6 | 9.4 | 78.8 |
| Elastic restoring (from 50% compression) | MPa | 8.0 | Unmeasurable | 3.0 | Unmeasurable |
| Tensile elongation at break | % | 13.0 | 3.0 | 8.0 | 3.0 |

|  |  | Example 5 | Example 6 | Example 7 | Example 8 |
|---|---|---|---|---|---|
| Reinforced fibers | Type | Carbon fibers | Carbon fibers | Aramid fibers | Aramid fibers |
| Tensile elongation at break | % | 2.1 | 2.1 | 4.4 | 4.4 |
| First plastic | Type | Polyamide | Polyamide | Polyurethane | Polyurethane |
| Softening point | ° C. | 85 | 85 | 195 | 195 |
| Melting point | ° C. | 212 | — | 212 | 212 |
| Amount relative to 100 parts by mass of reinforced fibers | Parts by mass | 10 | 10 | 10 | 10 |
| Second plastic | Type | Silicone rubber | Polyester plastic | Polyester plastic | Polyester plastic |
| Coating of crossing point between reinforced fibers | Present or absent | Present | Present | Present | Present |
| Coating thickness of first plastic and second plastic | μm | 4.8 | 2.0 | 5.0 | 5.0 |
| Structure | — |  |  |  |  |
| Density | g/cm³ | 0.42 | 0.23 | 0.39 | 1.16 |
| Volume content of voids | Vol % | 66.7 | 83.3 | 66.7 | 0 |
| Volume content of total of reinforced fibers and first plastic | Vol % | 7.1 | 7.1 | 6.7 | 20.1 |
| Volume content of second plastic | Vol % | 26.2 | 9.6 | 26.6 | 79.9 |
| Elastic restoring |  |  |  |  |  |

TABLE 2-continued

|  |  |  |  |  |  |
|---|---|---|---|---|---|
| (from 50% compression) | MPa | 5.0 | 3.0 | 3.0 | Unmeasurable |
| Tensile elongation at break | % | 12.0 | 5.0 | 19.0 | 4.0 |

TABLE 3

|  |  | Comparative example 1 | Comparative example 2 | Comparative example 3 |
|---|---|---|---|---|
| Reinforced fibers | Type | Carbon fibers | Carbon fibers | Aramid fibers |
|     Tensile elongation at break | % | 2.1 | 2.1 | 4.4 |
| First plastic | Type | Polyamide | Polyurethane | None |
|     Softening point | °C. | 85 | 195 | — |
|     Melting point | °C. | — | 212 | — |
|     Amount relative to 100 parts by mass of reinforced fibers | Parts by mass | 8 | 30 | — |
| Second plastic | Type | Epoxy plastic | None | Epoxy plastic |
|     Coating of crossing point between reinforced fibers | Present or absent | Present | — | Present |
| Volume content of first plastic or second plastic | μm | 4.8 | 0.9 | 1.9 |
| Structure | — |  |  |  |
|     Density | g/cm³ | 1.32 | 0.74 | 1.31 |
|     Volume content of voids | Vol % | 0 | 33.3 | 0 |
|     Volume content of total of reinforced fibers and first plastic | Vol % | 20.2 | 18.2 | 45.5 |
|     Volume content of first plastic or second plastic | Vol % | 79.8 | 48.4 | 54.5 |
|     Elastic restoring (from 50% compression) | MPa | Unmeasurable | 0.3 | Unmeasurable |
|     Tensile elongation at break | % | 2.0 | 0.2 | 0.8 |

INDUSTRIAL APPLICABILITY

According to the present invention, it is possible to provide a structure having excellent flexibility represented by elastic restoring from compression or tensile elongation at break, and excellent lightness.

The invention claimed is:

1. A structure of fiber-reinforced plastic comprising:
   reinforced fibers that are discontinuous fibers and have a mass average fiber length of 1 to 15 mm,
   a first plastic that exhibits no rubber elasticity at room temperature and has a softening point or melting point of 50° C. or higher, and
   a second plastic that exhibits rubber elasticity at room temperature, has a tensile elongation at break of 200% or more, and has a tensile strength at break of 10 MPa or more, wherein
   crossing points between the reinforced fibers in contact with each other have a first inner coating of the first plastic and a second outer coating of the second plastic, and
   the structure of fiber-reinforced plastic further comprises voids as spaces formed by the first plastic and second plastic-coated reinforced fibers that are columnar supporting bodies and overlap or cross with each other, wherein a volume content of the voids in the structure is in a range of 10 vol % or more and 97 vol % or less.

2. The structure according to claim 1, wherein the structure has a density of 0.01 g/cm³ or more and 1.3 g/cm³ or less.

3. The structure according to claim 1, having an elastic restoring from 50% compression of 1 MPa or more.

4. The structure according to claim 1, having a tensile elongation at break in a range of 1% or more and 20% or less.

5. The structure according to claim 1, wherein the reinforced fibers have a tensile elongation at break in a range of 1% or more and 10% or less.

6. The structure according to claim 1, wherein the reinforced fibers contain at least one selected from the group consisting of PAN-based carbon fibers, PITCH-based carbon fibers, glass fibers, and aramid fibers.

7. The structure according to claim 1, wherein the first plastic and/or the second plastic coating the crossing point between the reinforced fibers has a coating thickness in a range of 1 μm or more and 15 μm or less.

8. The structure according to claim 1, wherein the second plastic contains at least one selected from the group consisting of silicone rubber, ethylene propylene rubber, acrylonitrile butadiene rubber, chloroprene rubber, fluororubber, a polyolefin-based thermoplastic elastomer, a polyurethane-based thermoplastic elastomer, a polyester-based thermoplastic elastomer, and a polyamide-based thermoplastic elastomer.

9. The structure according to claim 1, wherein the first plastic is 5 parts by mass or more and 25 parts by mass or less relative to 100 parts by mass of the reinforced fibers.

* * * * *